United States Patent [19]
Anderson

[11] Patent Number: 5,367,437
[45] Date of Patent: Nov. 22, 1994

[54] MULTIPLE LAYER CAPACITOR MOUNTING ARRANGEMENT

[75] Inventor: W. Kyle Anderson, Rockford, Ill.

[73] Assignee: Sundstrand Corporation, Rockford, Ill.

[21] Appl. No.: 43,336

[22] Filed: Apr. 6, 1993

[51] Int. Cl.$^5$ ............................................. H05K 7/02
[52] U.S. Cl. ........................... 361/807; 361/328; 361/622; 361/810; 361/812; 257/533; 257/536
[58] Field of Search ............... 361/299, 328, 313, 330, 361/329, 744, 622, 600, 807–810, 812, 816, 818; 257/533, 536

[56] References Cited

U.S. PATENT DOCUMENTS

| | | |
|---|---|---|
| 3,721,746 | 3/1973 | Knappenberger ............ 174/35 MS |
| 5,045,971 | 9/1991 | Ono et al. ............... 361/386 |
| 5,281,154 | 1/1994 | Comerci et al. ............ 439/107 |

*Primary Examiner*—Leo P. Picard
*Assistant Examiner*—Young Whang
*Attorney, Agent, or Firm*—Marshall, O'Toole, Gerstein, Murray & Bicknell

[57] ABSTRACT

A mounting arrangement of the present invention is provided for packaging a plurality of multiple layer capacitors together. First and second coupling devices are coupled electrically to respective first and second electrodes of each multiple layer capacitor of the plurality of multiple layer capacitors. A clamping devices clamps the first and second coupling devices, the plurality of multiple layer capacitors, and an electrically insulating layer to a mounting surface so that the electrically insulating layer is between the first coupling devices and the mounting surface and so that the plurality of multiple layer capacitors are electrically connected in parallel between the first and second coupling devices.

28 Claims, 4 Drawing Sheets

MULTIPLE LAYER CAPACITOR MOUNTING ARRANGEMENT

TECHNICAL FIELD OF THE INVENTION

The present invention relates to a mounting arrangement for capacitors, and more particularly to a mounting arrangement for multiple layer capacitors (MLCs).

BACKGROUND OF THE INVENTION

Capacitors are commonly used in a variety of electrical applications. For example, capacitors are used to tune the frequency of radio and television receivers, to eliminate sparking in automobile ignition systems, as energy storing devices, in electronic flashing units, and as filters in power supplies such as variable speed, constant frequency power generation systems used for providing three phase electrical power. In a variable speed, constant frequency power generation system, a variable speed mechanical input, such as the engine of an aircraft, mechanically drives a generator at a variable speed. Because the generator is being driven at a variable speed, the frequency of its output signal is consequently variable. A variable speed, constant frequency power generation system converts the variable frequency output from a variable speed, mechanically driven generator into constant frequency alternating current for use by alternating current loads.

In a typical variable speed, constant frequency power generation system, a rectifier converts the variable frequency output from a variable speed, mechanically driven generator into a DC signal. An inverter then inverts the DC signal from the rectifier into constant frequency AC output power. Capacitors are typically used both at the output of the rectifier for smoothing the DC signal provided by the rectifier and at the output of the inverter for eliminating unwanted harmonics of the inverter fundamental frequency from the constant frequency AC output power.

Capacitors generally consist of two or more electrodes separated by a dielectric such as air or other material having a desired permittivity. The amount of capacitance of a capacitor is dependent upon the surface area of the electrodes of the capacitor, the distance separating the electrodes, and the permittivity of the dielectric separating the electrodes.

A capacitor can have a variety of geometric constructions. A parallel plate capacitor, for example, is a capacitor in which the electrodes thereof are parallel plates separated by a dielectric having both a thickness and a permittivity selected to control the amount of capacitance of the capacitor.

A cylindrical capacitor is a capacitor in which one of its electrodes is a first cylindrical hollow tube and another of its electrodes is a second cylindrical hollow tube concentric with the first cylindrical hollow tube. A dielectric between the first and second cylindrical hollow tubes has a thickness and a permittivity selected to control the capacitance of the cylindrical capacitor. A spherical capacitor has one electrode in the form of a hollow sphere surrounding another electrode in the form of a usually solid concentric sphere. The volume between the hollow sphere and the concentric sphere contains a dielectric having a thickness and a permittivity selected to control the capacitance of the spherical capacitor. A cylindrical film capacitor typically consists of a sandwich construction having at least four strips. These four strips are, in order, a first conducting strip, a first dielectric strip separating the first conducting strip from a second conducting strip, and a second dielectric strip. The four strips are wound such that, if the wound capacitor is viewed on end, the layers of the capacitor have a spiral appearance. In the resulting capacitor, the first and second dielectric strips electrically insulate the first and second conducting strips from one another.

One form of a parallel plate capacitor is a multiple layer capacitor (MLC) having two electrodes wherein each electrode comprises a plurality of parallel plates. The plurality of plates of the first electrode are electrically interconnected at one end thereof, and the plurality of plates of the second electrode are electrically interconnected at one end thereof. The plates of the two electrodes of this capacitor are interleaved so that, except for one outermost plate of each electrode, each plate of each electrode is sandwiched between two plates of the other electrode. A dielectric electrically insulates the plates of one electrode from the plates of the other electrode.

Various arrangements for electrically supporting a capacitor, such as a multiple layer capacitor, have been provided in the prior art. One common arrangement for electrically supporting a capacitor is a printed circuit board which has receptacles for receiving pins of the capacitor. The pins are inserted through holes in the printed circuit board and are then soldered to appropriate circuit paths on the printed circuit board. Thus, the solder used in soldering the capacitor to these circuit paths not only electrically connects the capacitor to the printed circuit board but also facilitates the support of the capacitor by the printed circuit board. It is often advantageous in many applications, such as in a variable speed, constant frequency power generation system, to use a plurality of smaller capacitors, each of which may be similar to the aforementioned multiple layer capacitor, in place of one large capacitor. Since the total capacitance of a plurality of parallel connected capacitors is equal to the sum of the individual capacitances of the capacitors, it is necessary to electrically connect these smaller capacitors in parallel in order to realize the same capacitance as the larger capacitor. Accordingly, it is often necessary to mount a group of capacitors (for example, as many as eight) together so that the capacitors are electrically connected in parallel.

One way of mounting a plurality of capacitors is to solder them together and to a frame. However, this arrangement can induce large mechanical stresses in the electrodes of the capacitor and in the dielectric which separates those electrodes. These mechanical stresses arise due to the presence of large temperature changes, such as those resulting when the capacitor cools down from its soldering temperature to the operating temperature of its environment. Mechanical stresses may also arise due to clamps used in mounting the capacitors. Accordingly, it is desirable to mount a plurality of capacitors so as to avoid such mechanical stresses and so that the capacitors are electrically connected in parallel. It is also desirable to mount these capacitors in such a way as to ensure that current is evenly distributed between the capacitors.

SUMMARY OF THE INVENTION

Accordingly, the present invention provides a mounting arrangement which permits a plurality of capacitors to be connected in parallel, which minimizes mechanical stress on the capacitors due both to thermal effects and to clamping loads, and which evenly distributes current between the capacitors. In one aspect of the present invention, an apparatus is provided for packaging capacitors together wherein each of the capacitors has first and second electrodes and a dielectric separating the first and second electrodes. The apparatus includes first and second conducting layers and a clamping means for clamping the capacitors between the first and second conducting layers and to a mounting surface so that the first conducting layer is electrically coupled to the first electrodes of at least some of the capacitors, so that the second conducting layer is electrically coupled to the second electrodes of at least some of the capacitors, and so that all of the capacitors are electrically connected between the first and second conducting layers and are clamped to the mounting surface.

An apparatus according to another aspect of the present invention includes a plurality of capacitors wherein each capacitor of the plurality of capacitors has first and second electrodes. The apparatus further includes a first coupling means coupled electrically to the first electrodes of at least some of the plurality of capacitors, a second coupling means coupled electrically to the second electrodes of at least some of the plurality of capacitors, an insulating layer, and a clamping means for clamping the first and second coupling means, the capacitors, and the electrically insulating layer to a mounting surface so that the electrically insulating layer is between the first coupling means and the mounting surface so as to electrically insulate the plurality of capacitors from the mounting surface and so that the plurality of capacitors are electrically connected between the first and second coupling means.

According to a further aspect of the invention, an apparatus is provided for packaging a plurality of multiple layer capacitors together wherein each multiple layer capacitor of the plurality of multiple layer capacitors has a first plurality of electrically conducting plates electrically connected to a first terminal end and a second plurality of electrically conducting plates electrically connected to a second terminal end and wherein the plates of the first plurality of electrically conducting plates and of the second plurality of electrically conducting plates are interleaved and are electrically insulated from one another. The apparatus includes a first coupling means for coupling electrically to the first terminal ends of the plurality of multiple layer capacitors, a second coupling means for coupling electrically to the second terminal ends of the plurality of multiple layer capacitors, an electrically insulating layer, and a clamping means for clamping the first and second coupling means, the plurality of multiple layer capacitors, and the electrically insulating layer to a mounting surface so that the electrically insulating layer is between the first coupling means and the mounting surface so as to electrically insulate the plurality of multiple layer capacitors from the mounting surface and so that the plurality of multiple layer capacitors are electrically connected in parallel between the first and second coupling means.

BRIEF DESCRIPTION OF THE DRAWING

These and other features and advantages will become more apparent from a detailed consideration of the invention when taken in conjunction with the drawing in which.

DETAILED DESCRIPTION

Figure 1:
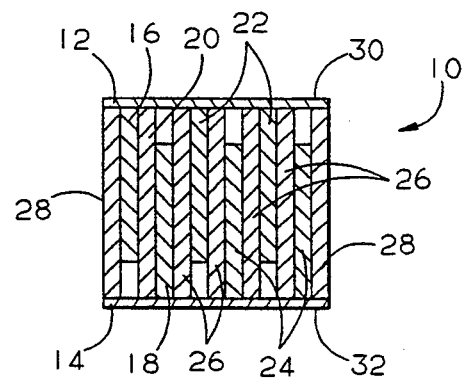
FIG. 1 is a cross-section of one of the multiple layer capacitors which can be mounted according to the mounting arrangement of the present invention.

In FIG. 1, a capacitor 10, which is in the form of a multiple layer capacitor, includes a first terminal end 12 and a second terminal end 14. Electrically coupled to the first terminal end 12 is a first plate 16, and electrically coupled to the second terminal end 14 is a second plate 18. A dielectric 20, which may be a ceramic dielectric, for example, separates the first plate 16 and the second plate 18. Additional plates 22 may also be electrically coupled to the first terminal end 12, and additional plates 24 may also be electrically coupled to the second terminal end 14. Additional ceramic dielectrics 26 may separate the additional plates 22 electrically coupled to the first terminal end 12 and the additional plates 24 electrically coupled to the second terminal end 14. End dielectrics 28 may further be provided, if desired, at the ends of the capacitor 10. Thus, the first plate 16, the additional plates 22, and the first terminal end 12 form a first electrode of the capacitor 10, and the second plate 18, the additional plates 24, and the second terminal end 14 form a second electrode 32 of the capacitor 10.

Figure 2:
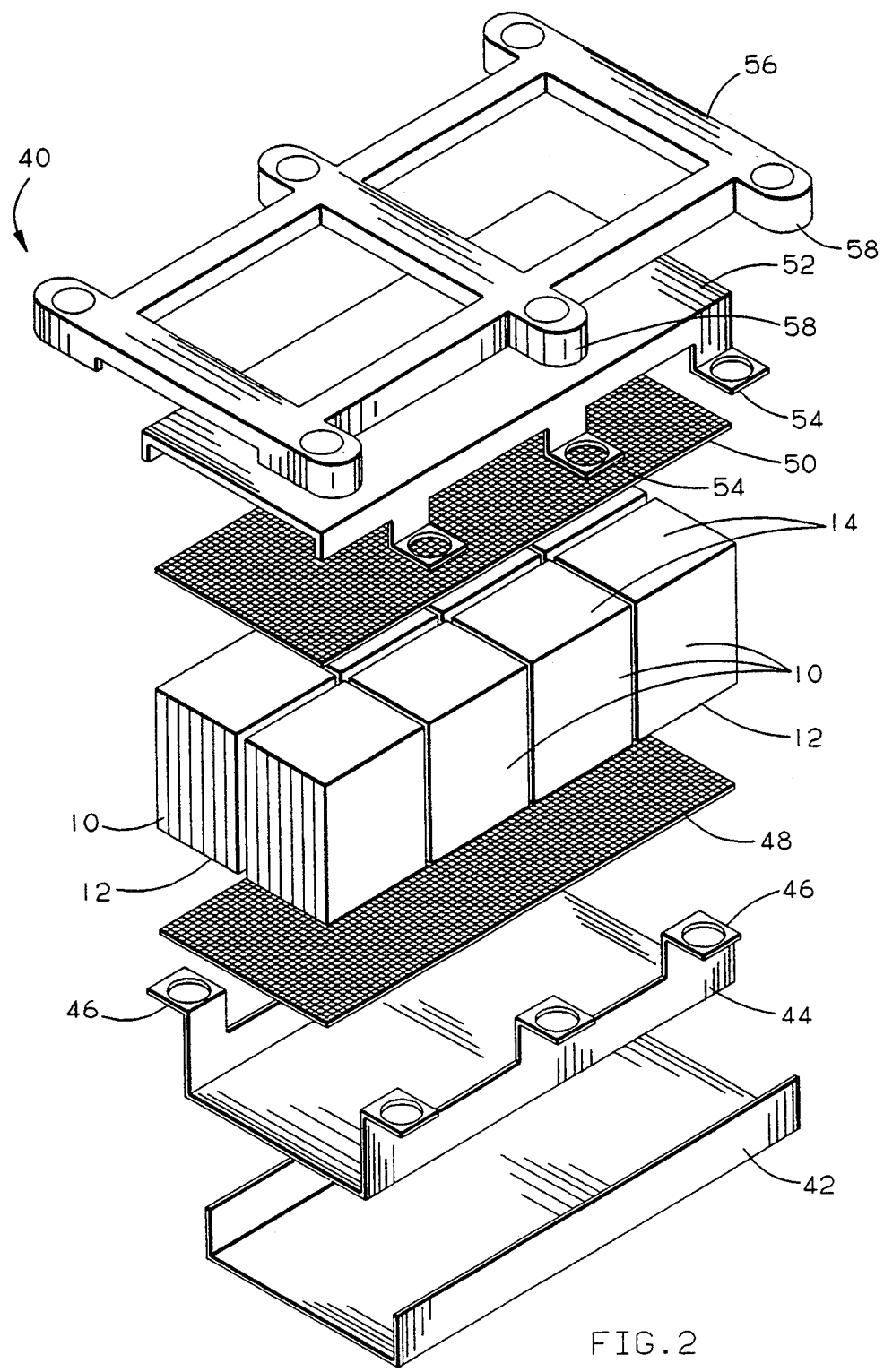
FIG. 2 shows a mounting arrangement for mounting a plurality of multiple layer capacitors.

Shown in FIG. 2 is a mounting arrangement 40 for mounting a plurality of capacitors, each capacitor of which may be constructed in accordance with the capacitor 10 shown in FIG. 1. The mounting arrangement 40 includes an electrically insulating layer 42 for providing electrical insulation between the capacitors 10 and the mounting surface to which the capacitors 10 are mounted. The mounting arrangement 40 next includes an electrically conducting layer 44 having appropriate connector tabs 46. The electrically conducting layer 44 may be a substantially rigid conducting layer and may be formed by stamping a copper strip into an appropriate shape such as that shown in FIG. 2 and, if desired, may be nickel-plated. The connector tabs 46 allow for electrical connection of the first terminal ends 12 of the capacitors 10 to a first electrical conductor of a circuit in which the capacitors 10 are to be used. Nut inserts may be provided in the holes of the tabs 46 to receive screws. Such screws may be used to attach the first electrical conductor of the aforementioned circuit to one or more of the connector tabs 46.

Next in the mounting arrangement 40 is a first flexible conducting pad 48 which may be an electrical conduction enhancing material such as a woven wire mesh commonly used for EMI shielding and which is in electrical contact with the first terminal ends 12 of each of the capacitors 10. Eight such capacitors are shown in FIG. 2. The first flexible conducting pad 48 is flexible in order to provide a good electrical contact between the first terminal ends 12 of the capacitors 10 and the electrically conducting layer 44 and to minimize mechanical stresses on the capacitors 10 due both to thermal effects and to clamping loads.

A second flexible conducting pad 50, which may be an electrical conduction enhancing material such as a woven wire mesh commonly used for EMI shielding, is in electrical contact with the second terminal ends 14 of the capacitors 10. As in the case of the first flexible conducting pad 48, the second flexible conducting pad 50 is flexible in order to provide a good electrical contact between the second terminal ends 14 of each of the capacitors 10 and an electrically conducting layer 52 and to minimize mechanical stresses on the capacitors 10 due both to thermal effects and to clamping loads.

The mounting arrangement 40 next includes the electrically conducting layer 52 having appropriate connector tabs 54. The electrically conducting layer 52 may be a substantially rigid conducting layer and may be formed by stamping a copper strip into an appropriate shape such as that shown in FIG. 2 and, if desired, may be nickel-plated. The connector tabs 54 allow for electrical connection of the second terminal ends 14 of the capacitors 10 to a second electrical conductor of the circuit in which the capacitors 10 are to be used. Nut inserts may be provided in the holes of the tabs 54 to receive screws. Such screws may be used to attach the second electrical conductor of the aforementioned circuit to one or more of the connector tabs 54.

The top-most layer of the mounting arrangement 40 is an electrically insulating clamping plate 56. The electrically insulating clamping plate 56 may be a plastic molded clamping plate having a plurality of tabs 58 each of which has a hole for receiving a mounting screw (not shown in FIG. 2).

Figure 3:
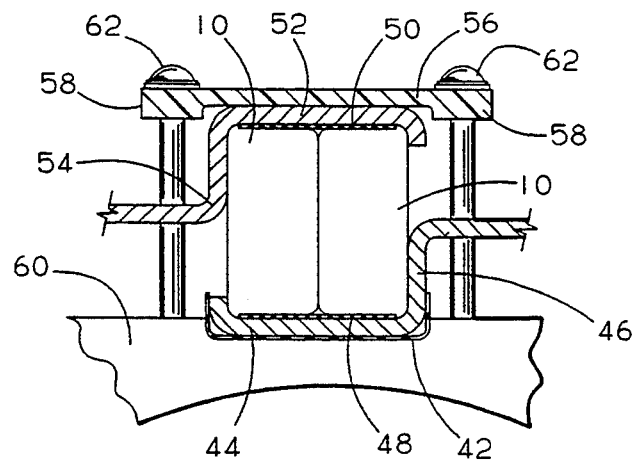
FIG. 3 shows an end view of the mounting arrangement according to the present invention wherein the mounting arrangement is attached to a mounting surface.

FIG. 3 shows an end view of the mounting arrangement 40. As shown in FIG. 3, the mounting arrangement is attached to a mounting surface 60. The electrically insulating layer 42 is placed on the mounting surface 60. The electrically conducting layer 44 is then placed on top of the electrically insulating layer 42. The first flexible conducting pad 48 is laid on top of the electrically conducting layer 44. A plurality of capacitors 10 is placed onto the first flexible conductive pad 48 so that the first terminal ends 12 of the capacitors 10 are in electrical contact with the first flexible conducting pad 48. This first flexible conducting pad 48 allows a certain degree of movement between the capacitors 10 and the electrically conducting layer 44 to relieve mechanical stresses and to provide even current distribution over the first terminal ends 12 of the capacitors 10.

Next, the second flexible conducting pad 50 is placed over the second terminal ends 14 of the capacitors 10. The second flexible conducting pad 50 provides electrical contact with the second terminal ends 14 of the capacitors 10 and, like the first flexible conducting pad 48, absorbs mechanical stresses and provides even current distribution over the second terminal ends 14 of the capacitors 10.

The electrically conducting layer 52 is placed over the second flexible conductive pad 50, and the electrically insulating clamping plate 56 is placed over the electrically conducting layer 52. A plurality of clamping screws 62 are inserted through the tabs 58 of the electrically insulating clamping plate 56 and threaded into corresponding holes in the mounting surface 60. Tightening of the clamping screws 62 permits the electrically insulating clamping plate 56 to clamp the electrically insulating layer 42, the electrically conducting layer 44, the first flexible conducting pad 48, the capacitors 10, the second flexible conducting pad 50, and the electrically conducting layer 52 to the mounting surface 60. Thus, the capacitors 10 are clamped between the layers 44/48 and the layers 50/52 to the mounting surface 60 such that the electrically insulating layer 42 provides electrical insulation between the capacitors 10 and the mounting surface 60. The connector tabs 46 and 54 may then be electrically connected to a circuit as described above.

The tabs 58 of the electrically insulating clamping plate 56 should be offset from the tabs 54 of the electrically conducting layer 52 and from the tabs 46 of the electrically conducting layer 44 so that the clamping screws 62 do not interfere, and are not electrically in contact, with the tabs 46 and 54. Furthermore, if the capacitors 10 are used in a variable speed, constant frequency power generation system, for example, the mounting surface 60 may be the housing of the generator which supplies the variable frequency AC power to be converted to DC and then to constant frequency AC output power.

Figure 4:
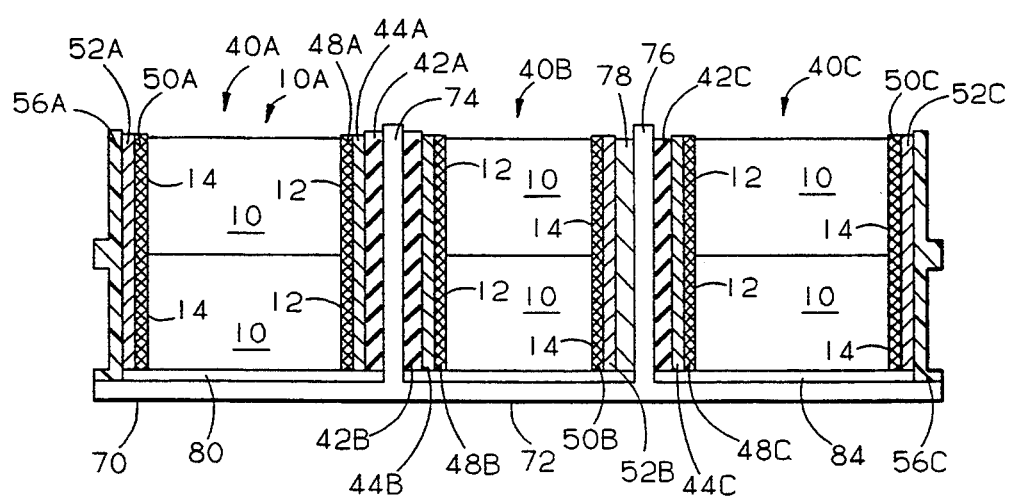
FIG. 4 shows a mounting arrangement for mounting three groups of capacitors wherein each group of capacitors may be associated with a corresponding phase of a three phase electrical system.

A variable speed, constant frequency power generation system is often arranged to provide a plurality of phases of constant frequency AC power. The mounting arrangement shown in FIG. 4 can be used to mount three groups of capacitors wherein each group of capacitors is associated with one phase of three phases of AC power. As shown in FIG. 4, a support 70 has a first support plate 72, and second and third support plates 74 and 76 formed generally at right angles to the first support plate 72.

A first mounting arrangement 40A, similar to the mounting arrangement 40 shown in FIG. 2, mounts a first group 10A of capacitors 10 to the second mounting support plate 74. A second mounting arrangement 40B mounts a second group 10B of capacitors 10 between the second and third support plates 74 and 76. A third mounting arrangement 40C mounts a third group 10C of capacitors 10 to the third mounting support plate 76.

The mounting arrangement 40A includes an electrically insulating layer 42A, an electrically conducting layer 44A, a first flexible conducting pad 48A, a second flexible conducting pad 50A, an electrically conducting layer 52A, and an electrically insulating clamping plate 56A. The first group 10A of capacitors 10 are accordingly clamped between the layers 44A/48A and the layers 50A/52A to the second support plate 74 such that the electrically insulating layer 42A provides electrical insulation between the first group 10A of capacitors 10 and the support 70, such that the first terminal ends 12 of the capacitors 10 of the first group 10A are in electrical contact with the first flexible conducting pad 48A, and such that the second terminal ends 14 of the capacitors 10 of the first group 10A are in electrical contact with the second flexible conducting pad 50A.

The mounting arrangement 40B includes an electrically insulating layer 42B, an electrically conducting layer 44B, a first flexible conducting pad 48B, a second flexible conducting pad 50B, an electrically conducting layer 52B, and a second insulating layer 78. The second group 10B of capacitors 10 are accordingly clamped between the layers 44B/48B and the layers 50B/52B and between the second support plate 74 and the third support plate 76 such that the electrically insulating layers 42B and 78 provide electrical insulation between the first group 10B of capacitors 10 and the support 70, such that the first terminal ends 12 of the capacitors 10 of the first group 10B are in electrical contact with the first flexible conducting pad 48B, and such that the second terminal ends 14 of the capacitors 10 of the first group 10B are in electrical contact with the second flexible conducting pad 50B.

The mounting arrangement 40C includes an electrically insulating layer 42C, an electrically conducting layer 44C, a first flexible conducting pad 48C, a second flexible conducting pad 50C, an electrically conducting layer 52C, and an electrically insulating clamping plate 56C. The first group 10C of capacitors 10 are accordingly clamped between the layers 44C/48C and the layers 50C/52C to the third support plate 76 such that the electrically insulating layer 42C provides electrical insulation between the third group 10C of capacitors 10 and the support 70, such that the first terminal ends 12 of the capacitors 10 of the third group 10C are in electrical contact with the first flexible conducting pad 48C, and such that the second terminal ends 14 of the capacitors 10 of the third group 10C are in electrical contact with the second flexible conducting pad 50C.

Suitable screw and nut arrangements may extend between the tabs of the electrically insulating clamping plates 56A and 56C to clamp all of the mounting arrangements 40A, 40B and 40C together and to the second and third support plates 74 and 76. Alternatively, suitable screw and nut arrangements may be provided to separately clamp the mounting arrangement 40A to the support plate 74, to suitably clamp the mounting arrangement 40B to the support plates 74 and/or 76, and to clamp the mounting arrangement 40C to the support plate 76. Additionally, an electrically insulating layer 80 may be provided to further electrically insulate the first group 10A of capacitors 10 from the support 70, an electrically insulating layer 82 may be provided to further electrically insulate the second group 10B of capacitors 10 from the support 70, and an electrically insulating layer 84 may be provided to further electrically insulate the second group 10C of capacitors 10 from the support 70.

If tolerances with respect to the arrangement shown in FIG. 4 should build up incorrectly, it is possible to eliminate the first support plate 72, the second support plate 74, and the third support plate 76, together with the insulating layers 42B and 42C. The remaining layers and the capacitors 10 may then be suitably clamped together.

Figure 5:
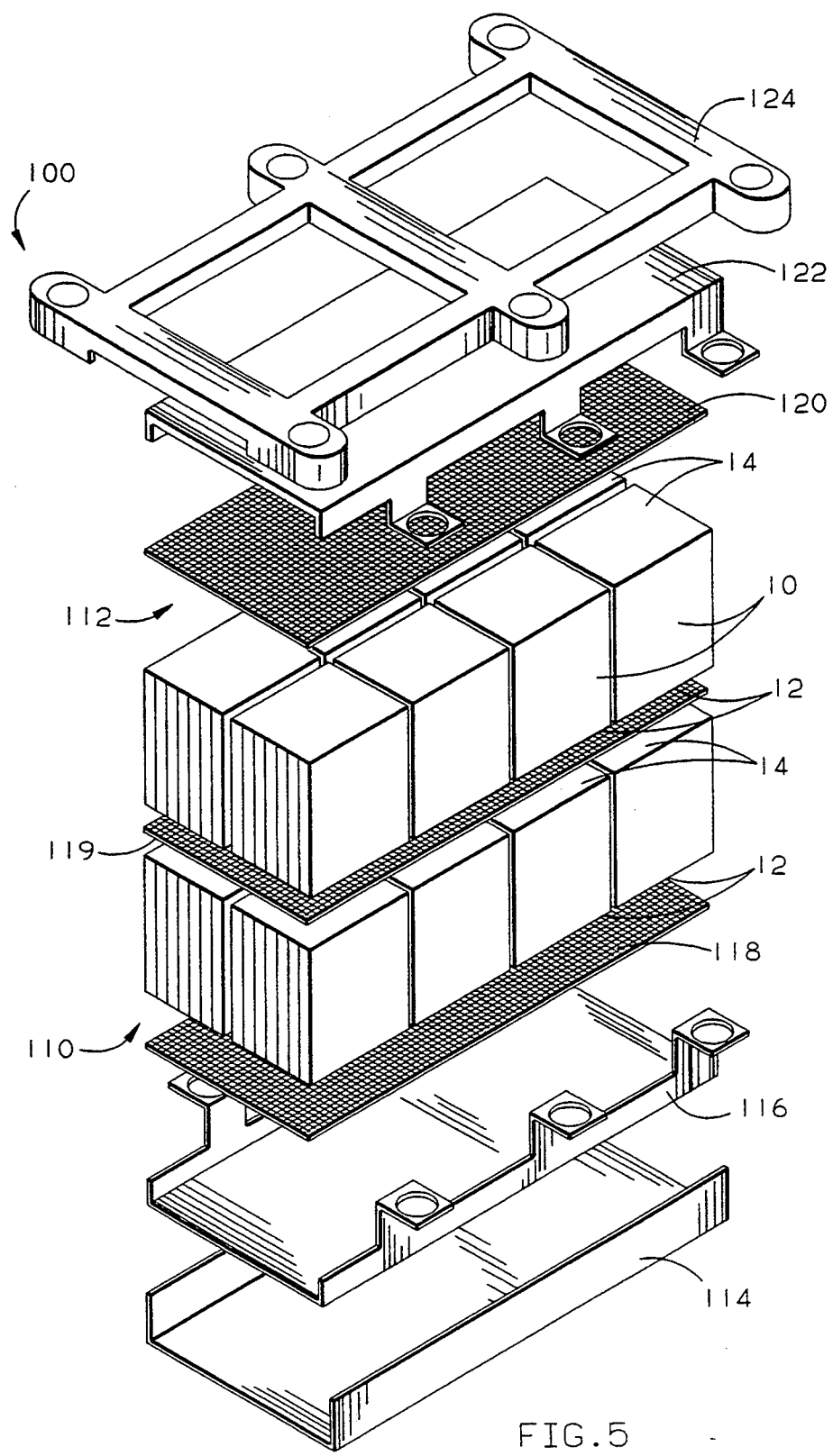
FIG. 5 shows an alternative mounting arrangement for mounting a plurality of multiple layer capacitors; and, FIG. 6 shows an alternative to the mounting arrangement shown in FIG. 5.

Shown in FIG. 5 is a mounting arrangement 100 for mounting two groups 110 and 112 of the capacitors 10 to a mounting surface. The mounting arrangement 100 includes an electrically insulating layer 114 for providing electrical insulation between the two groups 110 and 112 of the capacitors 10 and the mounting surface to which the two groups 110 and 112 of the capacitors 10 are mounted. The mounting arrangement 100 then next includes an electrically conducting layer 116. The electrically conducting layer 116 may be a substantially rigid conducting layer and may be formed by stamping a copper strip into an appropriate shape such as that shown in FIG. 5 and, if desired, may be nickel-plated.

Next in the mounting arrangement 100 is a first flexible conducting pad 118 which may be an electrical conduction enhancing material such as a woven wire mesh commonly used for EMI shielding. The first flexible conducting pad 118 is flexible in order to provide a good electrical contact between the first terminal ends 12 of the capacitors 10 of the first group 110 and the electrically conducting layer 116 and to minimize mechanical stresses on the capacitors due both to thermal effects and to clamping loads.

A second flexible conducting pad 119, which may be an electrical conduction enhancing material such as a woven wire mesh commonly used for EMI shielding, is placed between the second terminal ends 14 of the capacitors 10 in the first group 110 and the first terminal ends 12 of the capacitors 10 in the second group 112.

A third flexible conducting pad 120, which may be an electrical conduction enhancing material such as a woven wire mesh commonly used for EMI shielding, is in electrical contact with the second terminal ends 14 of the second group 112 of the capacitors 10. As in the case of the first flexible conducting pad 118, the second flexible conducting pad 120 is flexible in order to provide a good electrical contact between the second terminal ends 14 of the capacitors 10 in the second group 112 and an electrically conducting layer 122 and to minimize mechanical stresses on the capacitors due both to thermal effects and to clamping loads.

The mounting arrangement 100 next includes the electrically conducting layer 122. The electrically conducting layer 122 may be a substantially rigid conducting layer and may be formed by stamping a copper strip into an appropriate shape such as that shown in FIG. 5 and, if desired, may be nickel-plated.

The top-most layer of the mounting arrangement 100 is an electrically insulating clamping plate 124. The electrically insulating clamping plate 124 may be a plastic molded clamping plate having a plurality of tabs each of which has a hole for receiving a mounting screw (not shown in FIG. 5). The mounting arrangement 100 may be mounted to a mounting surface in a manner similar to the manner in which the mounting arrangement 40 is mounted to the mounting surface 60.

With the arrangement shown in FIG. 5, by connecting the electrically conducting layer 122 to a supply line, for example, and the electrically conducting layer 116 to a return line, all of the capacitors 10 in the first group 110 are connected in parallel with one another, all of the capacitors 10 in the second group 112 are connected in parallel with one another, but the capacitors 10 in the first group 110 are connected in series with the capacitors 10 in the second group 112.

Figure 6:
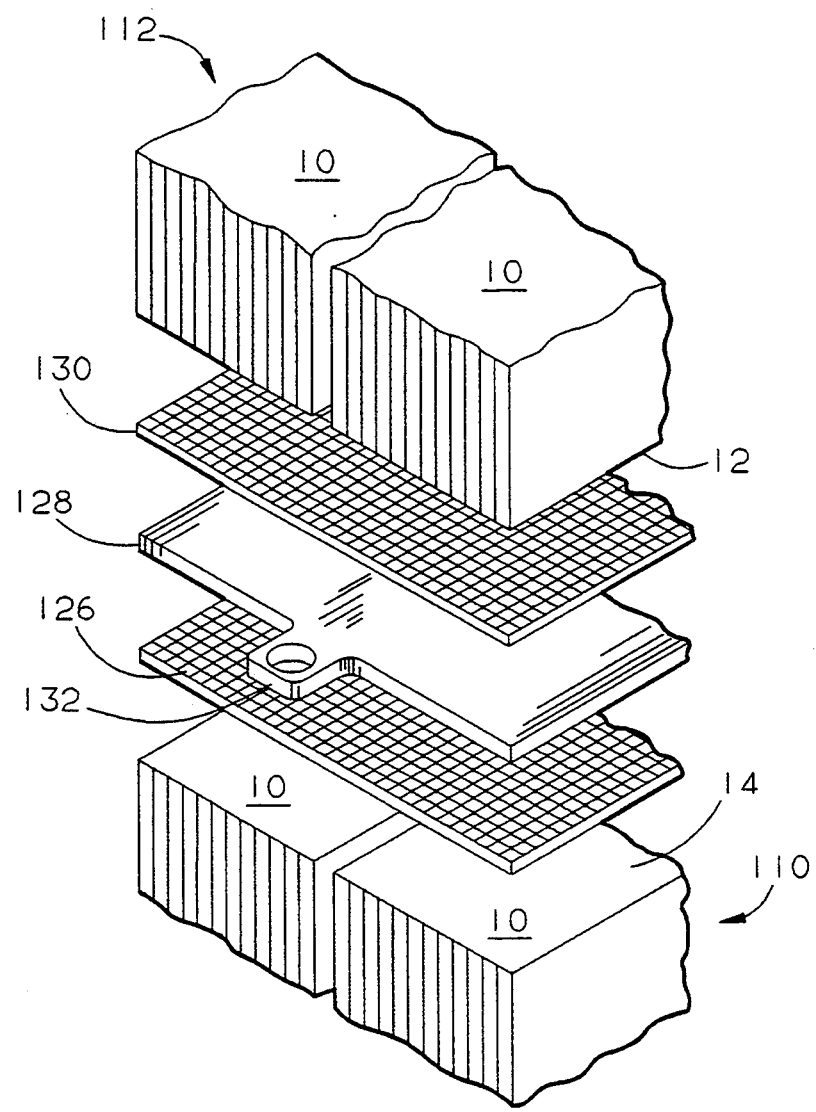

On the other hand, by connecting the electrically conducting layers 116 and 122 to a supply line and by connecting the second terminal ends 14 of the first group 110 of the capacitors 10 and the first terminal ends 12 of the second group 112 of the capacitors 10 to return, all of the capacitors 10 in the first group 110 are connected in parallel with one another, all of the capacitors 10 in the second group 112 are connected in parallel with one another, and the capacitors 10 in the first group 110 are connected in parallel with the capacitors 10 in the second group 112. The arrangement shown in FIG. 6 accommodates this parallel connection of the capacitors in the first and second groups 110 and 112. Accordingly, a flexible conducting pad 126 is placed in good electrical contact with second terminal ends 14 of the capacitors 10 of the first group 110, an electrically conducting layer 128 is placed in good electrical contact with the flexible conducting pad 126, and a flexible conducting pad 130 is placed in good electrical contact between the first terminal ends 12 of the capacitors 10 of the second group 112 and the electrically conducting layer 128. The electrically conducting layer 128 has a connector tab 132 to facilitate the connection of the electrically conducting layer 128 to an electrical circuit.

Modifications to the mounting arrangement disclosed herein, other than the ones described above, may also be made without departing from the scope of the invention as will be readily apparent to those skilled in the art. For example, although the present mounting arrangement is shown for the mounting of parallel plate capacitors, it should be apparent that other forms of capacitors may be mounted by the disclosed mounting arrangement. Therefore, the scope of the present invention is to be limited only by the claims appended hereto.

I claim:

1. An apparatus for packaging capacitors together, each of the capacitors having first and second electrodes and a dielectric separating the first and second electrodes, the apparatus comprising:
   a first conducting layer;
   a second conducting layer; and,
   clamping means for clamping the capacitors between the first and second conducting layers and to a mounting surface so that the first conducting layer is electrically coupled to the first electrodes of at least some of the capacitors, so that the second conducting layer is electrically coupled to the second electrodes of at least some of the capacitors, and so that all of the capacitors are electrically connected between the first and second conducting layers and are clamped to the mounting surface.

2. The apparatus of claim 1 wherein the first conducting layer comprises a flexible conducting pad arranged to allow even current distribution to the first electrodes of the capacitors to which the first conducting layer is electrically coupled.

3. The apparatus of claim 1 wherein the first and second conducting layers comprise corresponding first and second flexible conducting pads arranged to allow even current distribution to the first and second electrodes respectively of the capacitors to which the first and second conducting layers are respectively electrically coupled.

4. The apparatus of claim 3 wherein the first and second flexible conducting pads comprise corresponding first and second wire meshes.

5. The apparatus of claim 3 wherein the clamping means further comprises a third conducting layer between the first flexible conducting pad and the mounting surface.

6. The apparatus of claim 5 wherein the clamping means further comprises an electrically insulating clamping plate and a fourth conducting layer between the insulating clamping plate and the second flexible conducting pad.

7. The apparatus of claim 6 wherein the first and second flexible conducting pads comprise corresponding first and second wire meshes.

8. The apparatus of claim 7 wherein the clamping means clamps the first and second flexible conducting pads, the third and fourth conducting layers, and the capacitors together so that the first flexible conducting pad and the third conducting layer are electrically coupled to the first electrodes of all of the capacitors and so that the second flexible conducting pad and the fourth conducting layer are electrically coupled to the second electrodes of all of the capacitors.

9. An apparatus comprising:
   a plurality of capacitors, each capacitor of the plurality of capacitors having first and second electrodes;
   first coupling means for coupling electrically to the first electrodes of at least some of the plurality of capacitors;
   second coupling means for coupling electrically to the second electrodes of at least some of the plurality of capacitors;
   an electrically insulating layer; and,
   clamping means for clamping the first and second coupling means, the capacitors, and the electrically insulating layer to a mounting surface so that the electrically insulating layer is between the first coupling means and the mounting surface so as to electrically insulate the plurality of capacitors from the mounting surface and so that the plurality of capacitors are electrically coupled between the first and second coupling means.

10. The apparatus of claim 9 wherein the first coupling means comprises a flexible conducting pad arranged (i) to allow even current distribution to the first electrodes of the capacitors to which the first coupling means is coupled electrically and (ii) to accommodate mechanical stresses.

11. The apparatus of claim 10 wherein the first coupling means comprises a substantially rigid conducting layer between the flexible conducting pad and the electrically insulating layer.

12. The apparatus of claim 11 wherein the flexible conducting pad comprises a wire mesh.

13. The apparatus of claim 9 wherein the first and second coupling means comprise corresponding first and second flexible conducting pads arranged (i) to allow even current distribution to the first and second electrodes of the capacitors to which the first and second coupling means are respectively coupled electrically and (ii) to accommodate mechanical stresses.

14. The apparatus of claim 13 wherein the first coupling means comprises a substantially rigid conducting layer between the first flexible conducting pad and the electrically insulating layer.

15. The apparatus of claim 14 wherein the first and second flexible conducting pads comprise corresponding first and second wire meshes.

16. The apparatus of claim 14 wherein the clamping means comprises an electrically insulating clamping plate and a substantially rigid conducting layer between the electrically insulating clamping plate and the second flexible conducting pad.

17. The apparatus of claim 16 wherein the first and second flexible conducting pads comprise corresponding first and second wire meshes.

18. The apparatus of claim 17 wherein the first flexible conducting pad and the substantially rigid conducting layer of the first coupling means are coupled electrically to the first electrodes of all of the capacitors of the plurality of capacitors and wherein the second flexible conducting pad and the substantially rigid conducting layer of the clamping means are coupled electrically to the second electrodes of all of the capacitors of the plurality of capacitors.

19. An apparatus for packaging a plurality of multiple layer capacitors together wherein each multiple layer capacitor of the multiple layer capacitors has a first plurality of electrically conducting plates electrically connected to a first terminal end and a second plurality of electrically conducting plates electrically connected to a second terminal end and wherein the plates of the first plurality of electrically conducting plates and of the second plurality of electrically conducting plates are interleaved and are electrically insulated from one another, the apparatus comprising:

first coupling means for coupling electrically to the first terminal ends of the plurality of multiple layer capacitors;

second coupling means for coupling electrically to the second terminal ends of the plurality of multiple layer capacitors; and, clamping means for clamping the first and second coupling means and the plurality of multiple layer capacitors to a mounting surface so that the plurality of multiple layer capacitors is electrically insulated from the mounting surface and so that the plurality of multiple layer capacitors are electrically connected in parallel between the first and second coupling means.

20. The apparatus of claim 19 wherein the first coupling means comprises a flexible conducting pad arranged to allow even current distribution to the first terminal ends of the plurality of multiple layer capacitors.

21. The apparatus of claim 20 wherein the first coupling means comprises a substantially rigid conducting layer between the flexible conducting pad and an electrically insulating layer.

22. The apparatus of claim 21 wherein the flexible conducting pad comprises a wire mesh.

23. The apparatus of claim 19 wherein the first coupling means comprises a first flexible conducting pad arranged to allow current distribution to the first terminal ends of the plurality of multiple layer capacitors and wherein the second coupling means comprises a second flexible conducting pad arranged to allow current distribution to the second terminal ends of the plurality of multiple layer capacitors.

24. The apparatus of claim 23 wherein the first coupling means comprises a substantially rigid conducting layer between the first flexible conducting pad and an electrically insulating layer.

25. The apparatus of claim 24 wherein the first and second flexible conducting pads comprise corresponding first and second wire meshes.

26. The apparatus of claim 24 wherein the clamping means comprises an electrically insulating clamping plate and a substantially rigid conducting layer between the electrically insulating clamping plate and the second flexible conducting pad.

27. The apparatus of claim 26 wherein the first and second flexible conducting pads comprise corresponding first and second wire meshes.

28. The apparatus of claim 27 wherein the first flexible conducting pad and the substantially rigid conducting layer of the first coupling means are coupled electrically to the first terminal ends of the plurality of multiple layer capacitors and wherein the second flexible conducting pad and the substantially rigid conducting layer of the clamping means are coupled electrically to the second terminal ends of the plurality of multiple layer capacitors.

* * * * *